United States Patent
Zhou et al.

(10) Patent No.: US 10,956,597 B2
(45) Date of Patent: Mar. 23, 2021

(54) LOSS FUNCTION VALUE DETERMINATION METHOD AND DEVICE AND ELECTRONIC EQUIPMENT

(71) Applicant: Advanced New Technologies Co., Ltd., Grand Cayman (KY)

(72) Inventors: Yashun Zhou, Hangzhou (CN); Lichun Li, Hangzhou (CN); Shan Yin, Hangzhou (CN); Huazhong Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/786,337

(22) Filed: Feb. 10, 2020

(65) Prior Publication Data
US 2020/0175190 A1 Jun. 4, 2020

Related U.S. Application Data

(63) Continuation of application No. PCT/CN2020/070939, filed on Jan. 8, 2020.

(30) Foreign Application Priority Data

May 23, 2019 (CN) .......................... 201910434666.0

(51) Int. Cl.
*G06F 21/62* (2013.01)
*G06N 20/00* (2019.01)
*G06Q 50/26* (2012.01)

(52) U.S. Cl.
CPC ......... *G06F 21/6218* (2013.01); *G06N 20/00* (2019.01); *G06Q 50/265* (2013.01)

(58) Field of Classification Search
USPC .......... 726/26, 2, 21, 36; 713/150, 163, 181; 380/255, 264, 276
See application file for complete search history.

(56) References Cited

U.S. PATENT DOCUMENTS

| 8,468,244 B2 | 6/2013 | Redlich et al. |
| 2009/0006275 A1* | 1/2009 | Takano .................. G06Q 40/00 705/36 R |

(Continued)

FOREIGN PATENT DOCUMENTS

| CN | 106548210 | 3/2017 |
| CN | 108418810 | 8/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Sharif E Ullah
(74) *Attorney, Agent, or Firm* — Fish & Richardson P.C.

(57) ABSTRACT

Implementations of the present specification provide a value determination for a loss function. In an implementation, a first share of data that was generated based on a first parameter is received from a partner. A first term is determined based on the first share of the data. A second share of the data is generated based on a second parameter and a random number and transmitted to the partner. A coefficient of a second term is determined based on the random number. A second term is determined based on the coefficient of the second term and the second share of the data. The value of the loss function is determined based on the first term and the second term.

20 Claims, 6 Drawing Sheets

(56) References Cited

U.S. PATENT DOCUMENTS

| | | | | |
|---|---|---|---|---|
| 2012/0330867 | A1* | 12/2012 | Gemulla | G06F 7/588 |
| | | | | 706/12 |
| 2017/0300811 | A1* | 10/2017 | Merhav | G06N 3/084 |
| 2018/0219842 | A1* | 8/2018 | Bellala | H04W 12/02 |
| 2018/0365595 | A1* | 12/2018 | Zhou | G06N 20/20 |
| 2019/0114511 | A1 | 4/2019 | Gao et al. | |
| 2019/0114544 | A1 | 4/2019 | Sundaram et al. | |

FOREIGN PATENT DOCUMENTS

| | | |
|---|---|---|
| CN | 108764666 | 11/2018 |
| CN | CA 109426861 | 3/2019 |
| CN | CA 109492420 | 3/2019 |
| CN | CA 110263294 | 9/2019 |
| TW | 201220353 | 5/2012 |
| TW | 201734871 | 10/2017 |
| TW | 201816669 | 5/2018 |
| TW | 201907318 | 2/2019 |
| TW | 201909090 | 3/2019 |
| WO | WO 2019079166 | 4/2019 |
| WO | WO 2019079180 | 4/2019 |

OTHER PUBLICATIONS

Nakamoto, "Bitcoin: A Peer-to-Peer Electronic Cash System," www.bitcoin.org, 2005, 9 pages.

International Search Report and Written Opinion in PCT Appln No. PCT/CN2020/070939, dated Apr. 8, 2020, 19 pages (with English translation).

Bickson et al, "Peer-to-Peer Secure Multi-Party Numerical Computation," in Eith International Conference on Peer-to-Peer Computing, Sep. 11, 2009, 10 pages.

* cited by examiner

LOSS FUNCTION VALUE DETERMINATION METHOD AND DEVICE AND ELECTRONIC EQUIPMENT

CROSS-REFERENCE TO RELATED APPLICATIONS

This application is a continuation of PCT Application No. PCT/CN2020/070939, filed on Jan. 8, 2020, which claims priority to Chinese Patent Application No. 201910434666.0, filed on May 23, 2019, and each application is hereby incorporated by reference in its entirety.

TECHNICAL FIELD

Implementations of the present specification relate to the field of computer technologies, and in particular to a loss function value determination method and device and electronic equipment.

BACKGROUND

There are many data silos in the era of big data. Data are usually distributed in different enterprises. These enterprises do not fully trust each other because of competition and privacy protection. In some cases, cooperative security modeling is needed between enterprises in order to use the data of each party to train a data processing model cooperatively, but also provide sufficient protection of enterprise data privacy.

In cooperative security modeling scenarios, a value of a loss function of the data processing model needs to be calculated. The value of the loss function can be used to measure a training effect of the data processing model (such as overfitting and underfitting), and then decide whether to terminate the training. Because the data used to train the data processing model is scattered among the parties involved in cooperative modeling, in the related technology, the data of the parties involved in cooperative modeling is usually aggregated at an independent third party, which calculates the value of the loss function. Aggregating the data of the parties involved in cooperative modeling can easily cause leakage of the enterprise data.

SUMMARY

An objective of implementations of the present specification is to provide a loss function value determination method and device and electronic equipment so that data parties involved in modeling can cooperatively calculate the value of the loss function while protecting data privacy.

To achieve the previous objective, one or more implementations of the present specification provide the following technical solutions:

According to a first aspect of one or more implementations of the present specification, a loss function value determination method is provided, where the loss function includes a first term and a second term; the method includes the following: secretly sharing first data with a partner based on a share of a first parameter to obtain a share of the first data; determining a share of a value of the first term based on the share of the first data; secretly sharing second data with the partner based on a share of a second parameter and a random number to obtain a share of the second data; determining a coefficient of the second term based on the random number, where the coefficient of the second term and the second data are jointly used to determine a value of the second term; and sending the share of the value of the first term, the share of the second data, and the coefficient of the second term to the partner, so that the partner determines the value of the loss function.

According to a second aspect of one or more implementations of the present specification, a loss function value determination device is provided, where the loss function includes a first term and a second term; the apparatus includes the following: a first secret sharing unit, configured to secretly share first data with a partner based on a share of a first parameter to obtain a share of the first data; a first determining unit, configured to determine a share of a value of the first term based on the share of the first data; a second secret sharing unit, configured to secretly share second data with the partner based on a share of a second parameter and a random number to obtain a share of the second data; a determining unit, configured to determine a coefficient of the second term based on the random number, where the coefficient of the second term and the second data are jointly used to determine a value of the second term; and a sending unit, configured to send the share of the value of the first term, the share of the second data, and the coefficient of the second term to the partner so that the partner determines the value of the loss function.

According to a third aspect of one or more implementations of the present specification, electronic equipment is provided, where the electronic equipment includes the following: one or more memories, configured to store a computer instruction; and one or more processors, configured to execute the computer instruction to implement the method step according to the first aspect.

According to a fourth aspect of one or more implementations of the present specification, a loss function value determination method is provided, where the loss function includes a first term and a second term; the method includes the following: secretly sharing first data with a partner based on a share of a first parameter and a label value to obtain a share of the first data; determining a first share of a value of the first term based on the share of the first data; secretly sharing second data with the partner based on a share of a second parameter to obtain a first share of the second data; receiving a second share of the value of the first term, a second share of the second data, and a coefficient of the second term from the partner, wherein the coefficient of the second term and the second data are jointly used to determine a value of the second term; and determining a value of the loss function based on the first share of the value of the first term, the second share of the value of the first term, the first share of the second data, the second share of the second data, and the coefficient of the second term.

According to a fifth aspect of one or more implementations of the present specification, a loss function value determination device is provided, where the loss function includes a first term and a second term; the apparatus includes the following: a first secret sharing unit, configured to secretly share first data with a partner based on a share of a first parameter and a label value to obtain a share of the first data; a first determining unit, configured to determine a first share of a value of the first term based on the share of the first data; a second secret sharing unit, configured to secretly share second data with the partner based on a share of a second parameter to obtain a first share of the second data; a receiving unit, configured to receive a second share of the value of the first term, a second share of the second data, and a coefficient of the second term from the partner, where the coefficient of the second term and the second data are jointly used to determine a value of the second term; and a determining unit, configured to determine a value of the loss function based on the first share of the value of the first term, the second share of the value of the first term, the first share of the second data, the second share of the second data, and the coefficient of the second term.

According to a sixth aspect of one or more implementations of the present specification, electronic equipment is provided, where the electronic equipment includes the following: one or more memories, configured to store a computer instruction; and one or more processors, configured to execute the computer instruction to implement the method step according to the fourth aspect.

As can be seen from the technical solutions provided in the previous implementations of the present specification, in some implementations of the present specification, a first data party and a second data party can use the secret sharing algorithm to cooperatively calculate the value of the loss function without leaking their own data. It is convenient to measure the training effect of the data processing model based on the value of the loss function, and then decide whether to terminate the training.

BRIEF DESCRIPTION OF DRAWINGS

To describe technical solutions in implementations of the present specification or in the existing technology more clearly, the following briefly describes the accompanying drawings needed for describing the implementations or the existing technology. Apparently, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

The following clearly describes the technical solutions in some implementations of the present specification with reference to the accompanying drawings in some implementations of the present specification. Apparently, the described implementations are merely some but not all of the implementations of the present specification. All other implementations obtained by a person of ordinary skill in the art based on the implementations of the present specification without creative efforts shall fall within the protection scope of the present specification. It should be understood that although terms "first", "second", "third", etc. can be used in the present specification to describe various types of information, the information should not be limited by these terms. These terms are only used to differentiate between information of the same type. For example, without departing from the scope of the present specification, first information can also be referred to as second information, and similarly, the second information can also be referred to as the first information.

Secret sharing (SS) is an algorithm for protecting data privacy. A plurality of data parties can use the secret sharing algorithm to perform cooperative calculation to obtain secret information without leaking their own data. Each data party can obtain one share of the secret information. A single data party cannot restore the secret information. The secret information can only be restored through cooperation of the plurality of data parties. For example, data party $P_1$ owns data $x_1$ and data party $P_2$ owns data $x_2$. By using the secret sharing algorithm, data party $P_1$ and data party $P_2$ can perform cooperative calculation to obtain secret information $y=y_1+y_2=x_1x_2$. After calculation, data party $P_1$ can obtain share $y_1$ of secret information y, and data party $P_2$ can obtain share $y_2$ of secret information y.

The loss function can be used to measure a degree of inconsistency between a predicted value and a real value of the data processing model. A smaller value of the loss function indicates better robustness of the data processing model. When the data processing model is trained, the value of the loss function can be calculated and used to measure a training effect of the data processing model (such as overfitting and underfitting), and then decide whether to terminate the training. The data processing model includes but is not limited to the logistic regression model, the linear regression model, the neural network model, etc. Different data processing models can be measured by using different loss functions. For example, the logistic regression model can be measured by using the logarithmic loss function, and the linear regression model can be measured by using the square loss function.

In the cooperative security modeling scenario, to protect data privacy, a plurality of data parties can cooperatively train the data processing model based on their own data without leaking their own data. In some example scenarios, there are two data parties for cooperative security modeling. One party can own complete sample data and the other party can own a label value of the sample data. Alternatively, one data party can own some data items of the sample data, and the other data party can own some other data items and the label value of the sample data. For example, the sample data includes user's savings and loan amounts. One data party can own the user's savings amount and the other data party can own the user's loan amount and the label value of the sample data.

The plurality of data parties need to cooperatively calculate the value of the loss function to decide whether to terminate the training. Considering that the data used to train the data processing model is scattered among the data parties of cooperative modeling, if the secret sharing algorithm is used, the data parties of cooperative modeling can cooperatively calculate the value of the loss function based on their own data without leaking their own data.

The present specification provides an implementation of a loss function value determination method.

Figure 1:
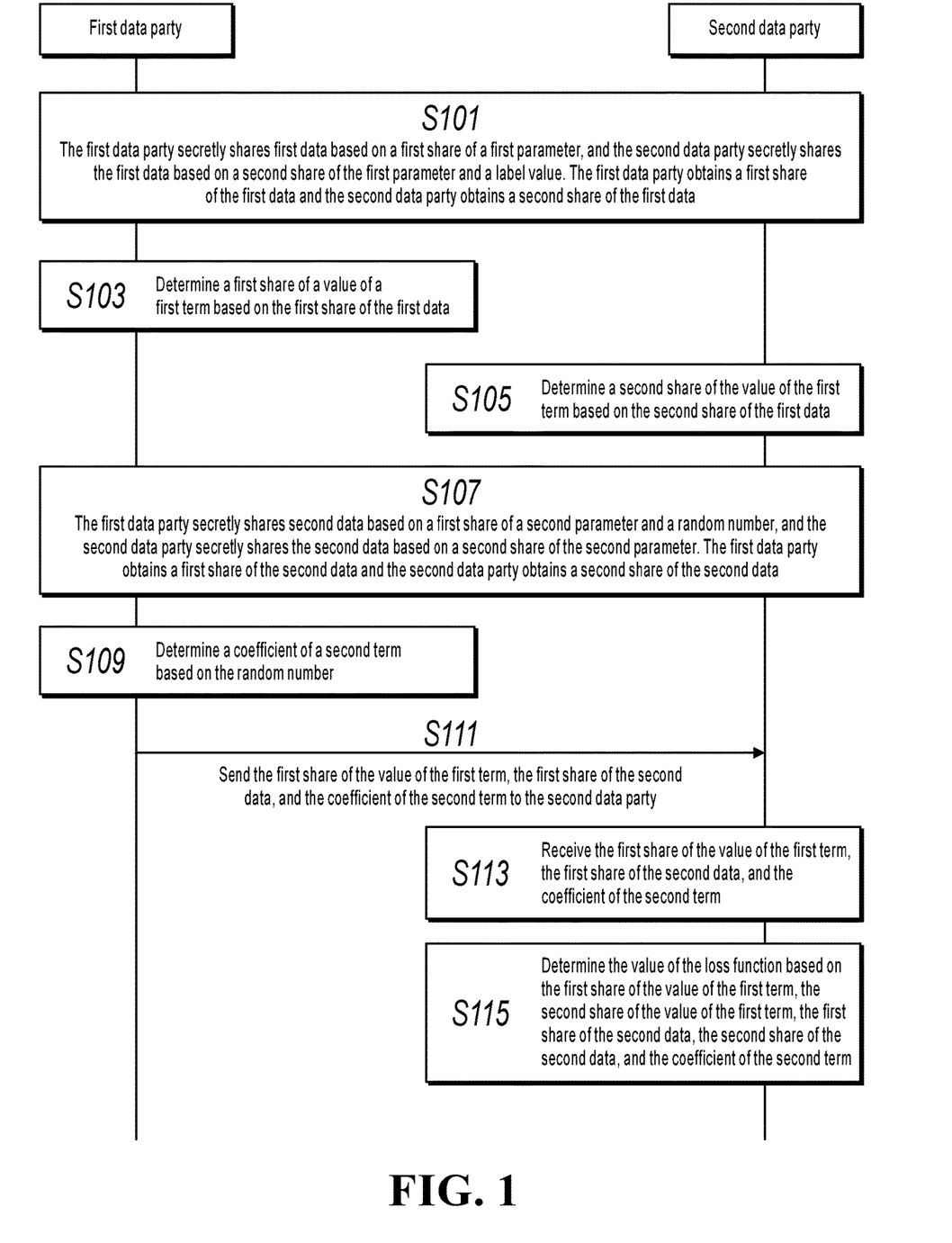
FIG. 1 is a flowchart illustrating a loss function value determination method, according to an implementation of the present specification.

Referring to FIG. 1, the implementation can include the following steps.

S101: A first data party secretly shares first data based on a first share of a first parameter, and a second data party secretly shares the first data based on a second share of the first parameter and a label value. The first data party obtains a first share of the first data and the second data party obtains a second share of the first data.

S103: The first data party determines a first share of a value of a first term based on the first share of the first data.

S105: The second data party determines a second share of the value of the first term based on the second share of the first data.

S107: The first data party secretly shares second data based on a first share of a second parameter and a random number, and the second data party secretly shares the second data based on a second share of the second parameter. The first data party obtains a first share of the second data and the second data party obtains a second share of the second data.

S109: The first data party determines a coefficient of a second term based on the random number.

S111: The first data party sends the first share of the value of the first term, the first share of the second data, and the coefficient of the second term to the second data party.

S113: The second data party receives the first share of the value of the first term, the first share of the second data, and the coefficient of the second term.

S115: The second data party determines the value of the loss function based on the first share of the value of the first term, the second share of the value of the first term, the first share of the second data, the second share of the second data, and the coefficient of the second term.

The following describes some of the terms used in some implementations.

(1) First term and second term. The first term and the second term are respectively function terms in the loss function.

In some example scenarios, the loss function can be a logarithmic loss function $$L(\theta) = -\frac{1}{m}\sum_{i=1}^{m}[y_i \log h_\theta(x_i) + (1-y_i)\log(1-h_\theta(x_i))],$$

where m represents an amount of sample data; $x_i$ represents an ith piece of sample data; $y_i$ represents a label value of sample data $x_i$; $\theta$ represents a model parameter of a data processing model; and $h_\theta(x_i)$ represents a value of an excitation function of the data processing model and $$h_\theta(x_i) = \frac{1}{1+e^{-\theta x_i}}.$$

$$\begin{aligned}L(\theta) &= -\frac{1}{m}\sum_{i=1}^{m}[y_i(\log h_\theta(x_i)) + (1-y_i)\log(1-h_\theta(x_i))] \\ &= -\frac{1}{m}\sum_{i=1}^{m}\left[y_i\log\frac{1}{1+e^{-\theta x_i}} + (1-y_i)\log\frac{e^{-\theta x_i}}{1+e^{-\theta x_i}}\right] \\ &= -\frac{1}{m}\sum_{i=1}^{m}\left[y_i\log\frac{1}{1+e^{-\theta x_i}} + (1-y_i)(-\theta x_i + \log\frac{1}{1+e^{-\theta x_i}})\right] \\ &= -\frac{1}{m}\sum_{i=1}^{m}[\log h_\theta(x_i) + (1-y_i)(-\theta x_i)] \\ &= -\frac{1}{m}\sum_{i=1}^{m}\log h_\theta(x_i) + \frac{1}{m}\sum_{i=1}^{m}(1-y_i)\theta x_i \\ &= -\frac{1}{m}\log\prod_{i=1}^{m}h_\theta(x_i) + \frac{1}{m}\sum_{i=1}^{m}(1-y_i)\theta x_i \\ &= -\frac{1}{m}\log\prod_{i=1}^{m}h_\theta(x_i)r_i \Big/ \prod_{i=1}^{m}r_i + \frac{1}{m}\sum_{i=1}^{m}(1-y_i)\theta x_i,\end{aligned}$$

where $r_i$ represents an ith random number.

The first term can be $$\frac{1}{m}\sum_{i=1}^{m}(1-y_i)\theta x_i$$

and the second term can be $$-\frac{1}{m}\log\prod_{i=1}^{m}h_\theta(x_i)r_i \Big/ \prod_{i=1}^{m}r_i.$$

(2) First data party and second data party. The first data party and the second data party are the two parties of cooperative security modeling respectively. The first data party can be a data party that does not own a label value, and the second data party can be a data party that owns a label value. For example, the first data party can own complete sample data and the second data party can own a label value of the sample data. Alternatively, the first data party can own some data items of the sample data, and the second data party can own some other data items and a label value of the sample data. The label value can be used to distinguish between different types of sample data, and a specific value can be taken, for example, from 0 and 1. The data parties can be electronic equipment. The electronic equipment can include a personal computer, a server, a handheld device, a portable device, a tablet device, and a multi-processor apparatus, or can further include a cluster of any apparatuses or equipment described above, etc.

(3) First parameter and second parameter. The first parameter and the second parameter are intermediate results obtained by the first data party and the second data party in the cooperative security modeling process, respectively. The first parameter and the second parameter are different. For example, the first parameter can be a product between the sample data and the model parameter of the data processing model, and the second parameter can be the value of the excitation function of the data processing model.

In the cooperative security modeling process, the first data party and the second data party separately obtain a share of the first parameter. For ease of description, the share obtained by the first data party can be used as the first share of the first parameter, and the share obtained by the second data party can be used as the second share of the first parameter. The sum of the first share of the first parameter and the second share of the first parameter is the first parameter. In addition, there can be a plurality of first parameters. As such, the first data party can own first shares of a plurality of first parameters, and the second data party can own second shares of a plurality of first parameters.

Referring back to the previous example scenario, the first parameter can be represented as $\theta x_i$, the first share of the first parameter can be represented as $>\theta x_i>_0$, and the second share of the first parameter can be represented as $<\theta x_i>_1$, where $<\theta x_i>_0 + <\theta x_i>_1 = \theta x_i$.

In the cooperative security modeling process, the first data party and the second data party separately obtain a share of the second parameter. For ease of description, the share obtained by the first data party can be used as the first share of the second parameter, and the share obtained by the second data party can be used as the second share of the second parameter. The sum of the first share of the second parameter and the second share of the second parameter is the second parameter. In addition, there can be a plurality of second parameters. As such, the first data party can own first shares of a plurality of second parameters, and the second data party can own second shares of a plurality of second parameters.

Referring back to the previous example scenario, the second parameter can be represented as $$h_\theta(x_i) = \frac{1}{1+e^{-\theta x_i}},$$

the first share of the second parameter can be represented as $<h_\theta(x_i)>_0$, and the second share of the second parameter can be represented as $<h_\theta(x_i)>_1$, where $<_\theta(x_i)>_0+<h_\theta(x_i)>_1=h_\theta(x_i)$.

(4) First data and second data. The first data and the second data are respectively calculated by the first data party and the second data party by using the secret sharing algorithm. The first data is used to determine the value of the first term. The second data can be combined with the coefficient of the second term to determine the value of the second term.

Referring back to the previous example scenario, the first data can be represented as $(1-y_i)\theta x_i$, the second data can be represented as $r_i h_\theta(x_i)$, and the coefficient of the second term can be represented as $$\prod_{i=1}^{m} r_i.$$

(5) Third data and fourth data. The third data and the fourth data are respectively calculated by the first data party and the second data party by using the secret sharing algorithm. The share of the first data can be determined based on a share of the third data. The share of the second data can be determined based on a share of the fourth data.

Referring back to the previous example scenario, the third data can be represented as $(1-y)<\theta x_i>_0$ and the fourth data can be represented as $r_i<h_\theta(x_i)>_1$.

In some implementations, in S101, the first data party can secretly share the first data based on a first share of the first parameter, and the second data party can secretly share the first data based on a second share of the first parameter and a label value. The first data party and the second data party can separately obtain a share of the first data. For ease of description, the share obtained by the first data party can be used as the first share of the first data, and the share obtained by the second data party can be used as the second share of the first data. The sum of the first share of the first data and the second share of the first data is the first data.

As described above, the first data party can own first shares of a plurality of first parameters, and the second data party can own second shares of a plurality of first parameters. As such, the first data party can secretly share first data based on a first share of each first parameter, and the second data party can secretly share first data based on a second share of the first parameter and a label value corresponding to the first parameter. The first data party can obtain the first share of the first data, and the second data party can obtain the second share of the first data. It is worthwhile to note that the correspondence between the first parameter and the label value can be understood as follows: Sample data corresponding to the label value and sample data used to calculate the first parameter are the same sample data.

Further, the first data party can secretly share third data based on a first share of each first parameter, and the second data party can secretly share third data based on a label value corresponding to the first parameter. The first data party and the second data party can separately obtain a share of the third data. For ease of description, the share obtained by the first data party can be used as the first share of the third data, and the share obtained by the second data party can be used as the second share of the third data. The sum of the first share of the third data and the second share of the third data is the third data. As such, the first data party can directly use the first share of the third data as the first share of the first data. The second data party can perform an operation on the second share of the first parameter and the label value corresponding to the first parameter based on a predetermined operation rule, can add an operation result to the second share of the third data, and can use an addition result as the second share of the first data.

Referring back to the previous example scenario, the first data party can secretly share the third data $(1-y_i)<\theta x_i>_0$ based on $<\theta x_i>_0$, and the second data party can secretly share the third data $(1-y)<\theta x_i>_0$ based on $1-y_i$. The first data party can obtain the first share $<[(1-y)<\theta x_i>_0]>_0$ of the third data. The second data party can obtain the second share $<[(1-y_i)<\theta x_i>_0]>_1$ of the third data, where $<[(1-y_i)<\theta x_i>_0]>_0+<[(1-y_i)<\theta x_i>_0]>_1=(1-y_i)<\theta x_i>_0$.

The first data party can directly use the first share $<[(1-y_i)<\theta x_i>_0]>_0$ of the third data as the first share $<(1-y_i)\theta x_i>_0$ of the first data. The second data party can obtain $(1-y_i)<\theta x_i>_1$ through calculation based on $<\theta x_1$ and $y_i$, can add a calculation result $(1-y_i)<\theta x_i>_1$ to the second share of the third data, and can use an addition result as the second share $<(1-y_i)\theta x_i>_1$ of the first data $(1-y_i)\theta x_i$, where $<(1-y_i)\theta x_i>_0+<(1-y_i)\theta x_i>_1=<[(1-y_i)<\theta x_i>_0]>_0+<[(1-y_i)<\theta x_i>_0]>_1+(1-y_i)<\theta x_i>_1=(1-y_i)\theta x_i$.

In some implementations, after S101, the first data party can obtain first shares of a plurality of first data. As such, in S103, the first data party can accumulate the first shares of the plurality of first data, and can determine the first share of the value of the first term based on an accumulation result. The first data party can divide the accumulation result by the number of pieces of first data (that is, the number of first parameters) to obtain the first share of the value of the first term.

Referring back to the previous example scenario, the first data party can calculate $$\frac{1}{m}\sum_{i=1}^{m}\langle(1-y_i)\theta x_i\rangle_0$$

as the first share of the value of the first term.

In some implementations, after S101, the second data party can obtain second shares of a plurality of first data. As such, in S105, the second data party can accumulate the second shares of the plurality of first data, and can determine the second share of the value of the first term based on an accumulation result. The second data party can divide the accumulation result by the number of pieces of first data (that is, the number of first parameters) to obtain the second share of the value of the first term. The sum of the first share of the value of the first term and the second share of the value of the first term is the value of the first term.

Referring back to the previous example scenario, the second data party can calculate $$\frac{1}{m}\sum_{i=1}^{m}\langle(1-y_i)\theta x_i\rangle_1$$

as the second share of the value of the first term.

$$\frac{1}{m}\sum_{i=1}^{m}\langle(1-y_i)\theta x_i\rangle_0 + \frac{1}{m}\sum_{i=1}^{m}\langle(1-y_i)\theta x_i\rangle_1 = \frac{1}{m}\sum_{i=1}^{m}(1-y_i)\theta x_i.$$

In some implementations, in S107, the first data party can secretly share the second data based on a first share of the second parameter and a random number, and the second data party can secretly share the second data based on a second share of the second parameter. The first data party and the second data party can separately obtain a share of the second data. For ease of description, the share obtained by the first data party can be used as the first share of the second data, and the share obtained by the second data party can be used as the second share of the second data. The sum of the first share of the second data and the second share of the second data is the second data.

As described above, there can be a plurality of second parameters. The first data party can generate a plurality of random numbers, and each random number can correspond to one second parameter (or one first share of the second parameter). A random number can be used to mask a second parameter for privacy protection, thereby preventing the second data party from obtaining a specific second parameter. As such, in S115 in the following, even if the second data party obtains the first share of the second data from the first data party, and further adds the first share of the second data to the second share of the second data owned by the second data party, the second data party obtains a product of the second parameter and the random number, and cannot obtain a specific second parameter. For a related example scenario, references can be made to S115 in the following. As such, the first data party can secretly share second data based on a first share of each second parameter and a random number corresponding to the second parameter, and the second data party can secretly share second data based on a second share of the second parameter. The first data party can obtain the first share of the second data, and the second data party can obtain the second share of the second data.

Further, the first data party can secretly share fourth data based on each random number, and the second data party can secretly share fourth data based on a second share of a second parameter corresponding to the random number. The first data party and the second data party can separately obtain a share of the fourth data. For ease of description, the share obtained by the first data party can be used as the first share of the fourth data, and the share obtained by the second data party can be used as the second share of the fourth data. The sum of the first share of the fourth data and the second share of the fourth data is the fourth data. As such, the first data party can multiply the first share of the second parameter by the random number, can add a multiplication result to the first share of the fourth data, and can use an addition result as the first share of the second data. The second data party can directly use the second share of the fourth data as the second share of the second data.

Referring back to the previous example scenario, the first data party can secretly share the fourth data $r_i\langle h_\theta(x_i)\rangle_1$ based on $r_i$, and the second data party can secretly share the fourth data $r_i\langle h_\theta(x_i)\rangle_1$ based on $\langle h_\theta(x_i)\rangle_1$. The first data party can obtain the first share $\langle[r_i\langle h_\theta(x_i)\rangle_1]\rangle_0$ of the fourth data, and the second data party can obtain the second share $\langle[r_i\langle h_\theta(x_i)\rangle_1]\rangle_1$ of the fourth data. $\langle[r_i\langle h_\theta(x_i)\rangle_1]\rangle_0 + \langle[r_i\langle h_\theta(x_i)\rangle_1]\rangle_1 = r_i\langle h_\theta(x_i)\rangle_1$.

The first data party can multiply $\langle h_\theta(x_i)\rangle_0$ by $r_i$, can add a multiplication result $r_i\langle h_\theta(x_i)\rangle_0$ to the first share $\langle[r_i\langle h_\theta(x_i)\rangle_1]\rangle_0$ of the fourth data, and can use an addition result as the first share $\langle r_i h_\theta(x_i)\rangle_0$ of the first data $r_i h_\theta(x_i)$. The second data party can directly use the second share $\langle[r_i\langle h_\theta(x_i)\rangle_1]\rangle_1$ of the fourth data as the second share $\langle r_i h_\theta(x_i)\rangle_1$ of the first data $r_i h_\theta(x_i)$. $\langle r_i h_\theta(x_i)\rangle_0 + \langle r_i h_\theta(x_i)\rangle_1 = r_i\langle h_\theta(x_i)\rangle_0 + \langle[r_i\langle h_\theta(x_i)\rangle_1]\rangle_0 + \langle[r_i\langle h_\theta(x_i)\rangle_1]\rangle_1 = r_i h_\theta(x_i)$.

In some implementations, in S109, the first data party can accumulatively multiply a plurality of random numbers to obtain a coefficient of the second term. Referring back to the previous example scenario, the first data party can calculate $$\prod_{i=1}^{m} r_i.$$

as the coefficient of the second term.

In some implementations, in S111, the first data party can send the first share of the value of the first term, the first shares of the plurality of second data, and the coefficient of the second term to the second data party. In S113, the second data party can receive the first share of the value of the first term, the first shares of the plurality of second data, and the coefficient of the second term.

In some implementations, in S115, the second data party can add the first share of the value of the first term to the second share of the value of the first term to obtain a value of the first term, can add the first share of the second data to the second share of the second data to obtain the second data, and can determine a value of the second term based on the second data and the coefficient of the second term. The second data party can add the value of the first term to the value of the second term to obtain the value of the loss function. The second data party can add a first share of second data to a second share of the second data to obtain the second data, can accumulatively multiply a plurality of second data, and can determine the value of the second term based on an accumulative multiplication result and the coefficient of the second term.

Referring back to the previous example scenario, the second data party can add the first share $$\frac{1}{m}\sum_{i=1}^{m}\langle(1-y_i)\theta x_i\rangle_0$$

of the value of the first term to the second share $$\frac{1}{m}\sum_{i=1}^{m}\langle(1-y_i)\theta x_i\rangle_1$$

of the value of the first term to obtain the value $$\frac{1}{m}\sum_{i=1}^{m}(1-y_i)\theta x_i$$

of the first term.

The second data party can add the first share $\langle r_i h_\theta(x_i)\rangle_0$ of the second data to the second share of the second data to obtain the second data $r_i h_\theta(x_i)$, and can calculate $$-\frac{1}{m}\log\prod_{i=1}^{m}h_\theta(x_i)r_i/\prod_{i=1}^{m}r_i$$

to obtain the value of the second term. It is worthwhile to note that, because a random number is used, even if the second data party adds the first share of the second data to the second share of the second data, the second data party obtains a product $r_i h_\theta(x_i)$ of the second parameter $h_\theta(x_i)$ and a random number $r_i$, and cannot obtain a specific second parameter $h_\theta(x_i)$, thereby masking the second parameter $h_\theta(x_i)$.

The second data party can add the value $$\frac{1}{m}\sum_{i=1}^{m}(1-y_i)\theta x_i$$

of the first term to the value $$-\frac{1}{m}\log\prod_{i=1}^{m}h_\theta(x_i)r_i/\prod_{i=1}^{m}r_i$$

of the second term to obtain the value of the logarithmic loss function $$L(\theta)=-\frac{1}{m}\sum_{i=1}^{m}[y_i\log h_\theta(x_i)+(1-y_i)\log(1-h_\theta(x_i))].$$

In the present implementation, the first data party and the second data party can use the secret sharing algorithm to cooperatively calculate the value of the loss function without leaking their own data. It is convenient to measure the training effect of the data processing model based on the value of the loss function, and then decide whether to terminate the training. For example, the second data party can send the value of the loss function to a Trusted Third Party (TTP), which determines whether to terminate the training.

Figure 2:
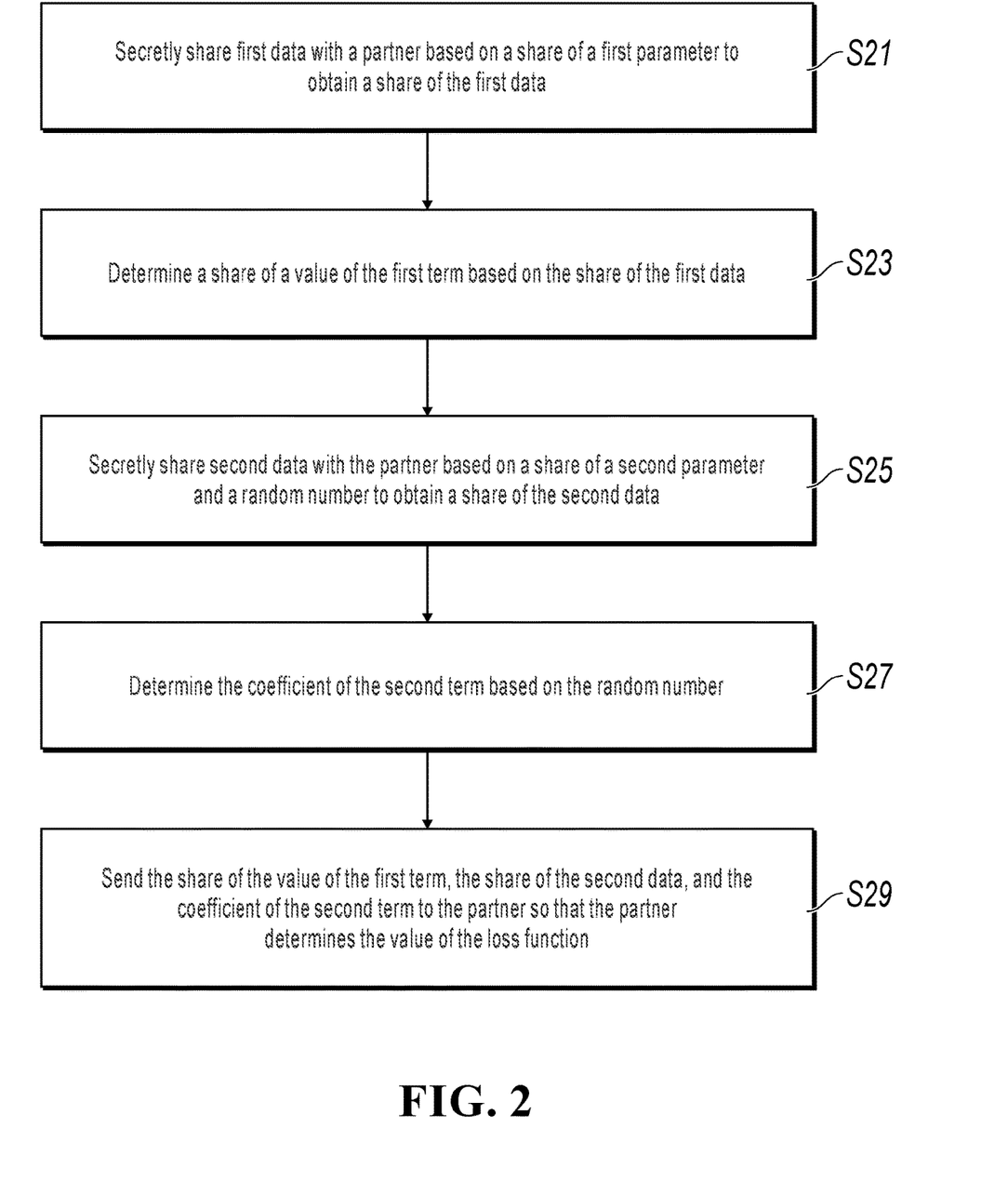
FIG. 2 is a flowchart illustrating a loss function value determination method, according to an implementation of the present specification.

Based on the same inventive concept, the present specification further provides an implementation of another loss function value determination method. The loss function can include a first term and a second term. The first term and the second term are respectively different function terms in the loss function. In the present implementation, the first data party serves as an execution body. The first data party can be a data party that does not own a label value. For example, the first data party can own complete sample data, or can own some data items of the sample data. Referring to FIG. 2, the implementation can include the following steps.

S21: Secretly share first data with a partner based on a share of a first parameter to obtain a share of the first data.

The partner can be understood as a data party that performs cooperative security modeling with the first data party, and can be the previous second data party. The first data party can secretly share the first data with the partner based on the share of the first parameter to obtain a corresponding share. For a specific process, references can be made to the related description in S101, and details are omitted here for simplicity.

S23: Determine a share of a value of the first term based on the share of the first data.

The first data party can accumulate the share of the first data, and can determine the share of the value of the first term based on an accumulation result. For a specific process, references can be made to the related description in S103, and details are omitted here for simplicity.

S25: Secretly share second data with the partner based on a share of a second parameter and a random number to obtain a share of the second data.

The second data can be combined with the coefficient of the second term in the following to determine the value of the second term. The first data party can generate a random number corresponding to the share of the second parameter, can multiply the share of the second parameter by the random number, can secretly share third data with the partner based on the random number to obtain a corresponding share, and can add a multiplication result to a share of the third data to obtain the share of the second data. For a specific process, references can be made to the related description in S107, and details are omitted here for simplicity.

S27: Determine the coefficient of the second term based on the random number.

The first data party can accumulatively multiply random numbers to obtain the coefficient of the second term. For a specific process, references can be made to the related description in S109, and details are omitted here for simplicity.

S29: Send the share of the value of the first term, the share of the second data, and the coefficient of the second term to the partner so that the partner determines the value of the loss function.

In the present implementation, the first data party can use the secret sharing algorithm to cooperate with the partner to calculate the share of the value of the first term, the share of the second data, and the coefficient of the second term without leaking the data owned by the first data party; and can send the share of the value of the first term, the share of the second data, and the coefficient of the second term to the partner so that the partner determines the value of the loss function.

Figure 3:
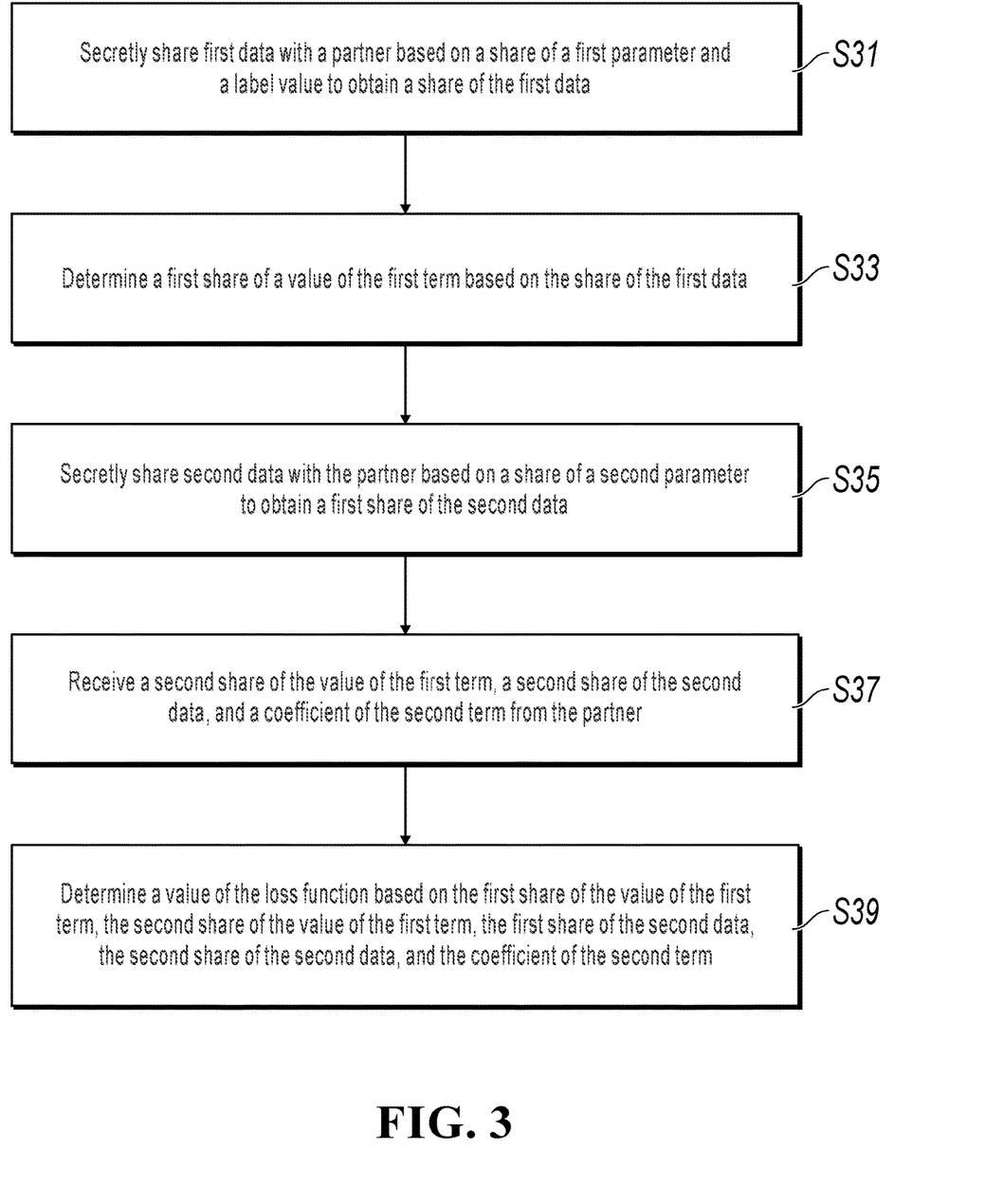
FIG. 3 is a flowchart illustrating a loss function value determination method, according to an implementation of the present specification.

Based on the same inventive concept, the present specification further provides an implementation of another loss function value determination method. The loss function can include a first term and a second term. The first term and the second term are respectively different function terms in the loss function. In the implementation, the second data party serves as an execution body. The second data party can be a data party that owns a label value. For example, the second data party can only own the label value, or can further own some data items of the sample data. Referring to FIG. 3, the implementation can include the following steps.

S31: Secretly share first data with a partner based on a share of a first parameter and a label value to obtain a share of the first data.

The partner can be understood as a data party that performs cooperative security modeling with the second data party, and can be the previous first data party. The second data party can perform an operation on the share of the first parameter and the label value based on a predetermined operation rule, can secretly share third data with the partner based on the label value to obtain a corresponding share, and can add an operation result to the share of the third data to obtain the share of the first data. For a specific process, references can be made to the related description in S101, and details are omitted here for simplicity.

S33: Determine a first share of a value of the first term based on the share of the first data.

The second data party can accumulate the share of the first data, and can determine the first share of the value of the first term based on an accumulation result. For a specific process, references can be made to the related description in S105, and details are omitted here for simplicity.

S35: Secretly share second data with the partner based on a share of a second parameter to obtain a first share of the second data.

The first data can be combined with the coefficient of the second term in the following to determine the value of the second term. For a specific process, references can be made to the related description in S107, and details are omitted here for simplicity.

S37: Receive a second share of the value of the first term, a second share of the second data, and a coefficient of the second term from the partner.

S39: Determine a value of the loss function based on the first share of the value of the first term, the second share of the value of the first term, the first share of the second data, the second share of the second data, and the coefficient of the second term.

The second data party can add the first share of the value of the first term to the second share of the value of the first term to obtain a value of the first term, can add the first share of the second data to the second share of the second data to obtain the second data, can determine the value of the second term based on the second data and the coefficient of the second term, and can add the value of the first term to the value of the second term to obtain the value of the loss function. For a specific process, references can be made to the related description in S115, and details are omitted here for simplicity.

In the present implementation, the second data party can use the secret sharing algorithm to cooperate with the partner to calculate the first share of the value of the first term and the first share of the second data without leaking the data owned by the second data party. As such, the second data party can determine the value of the loss function with reference to the second share of the value of the first term, the second share of the second data, and the coefficient of the second term from the partner.

Figure 4:
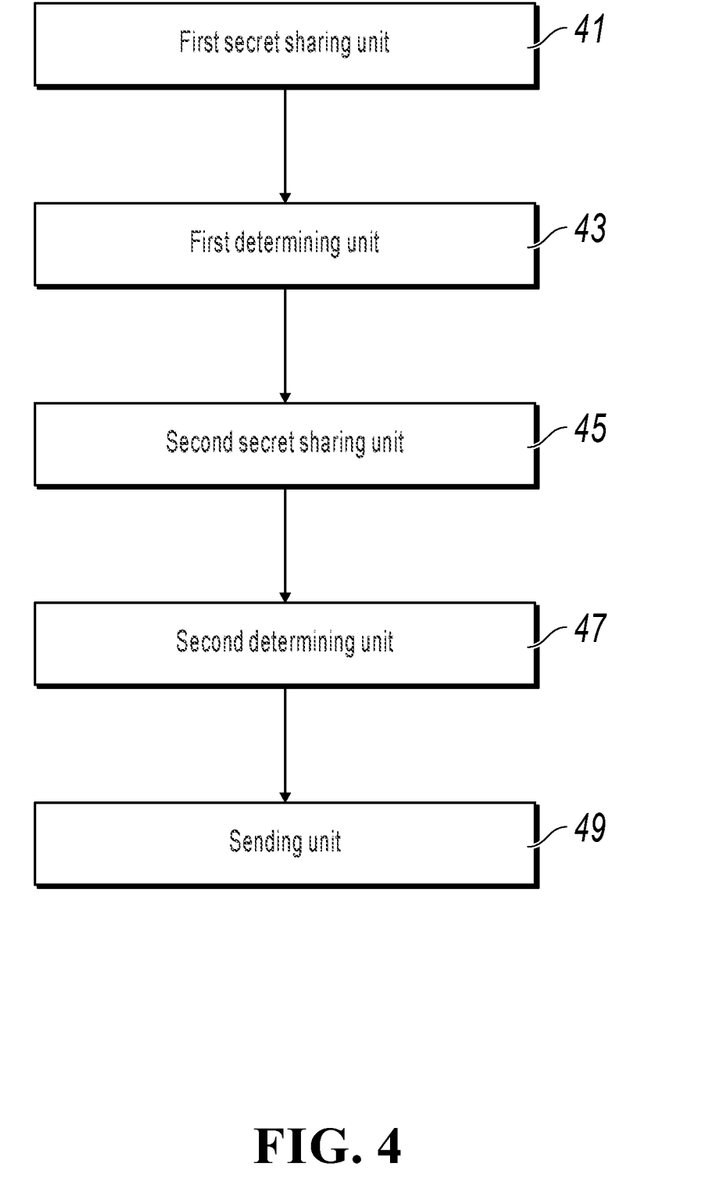
FIG. 4 is a functional structure diagram illustrating a loss function value determination device, according to an implementation of the present specification.

Based on the same inventive concept, the present specification further provides an implementation of a loss function value determination device. The loss function can include a first term and a second term. The first term and the second term are respectively different function terms in the loss function. The implementation can be applied to a first data party. The first data party can be a data party that does not own a label value. For example, the first data party can own complete sample data, or can own some data items of the sample data. Referring to FIG. 4, the implementation can include the following units: a first secret sharing unit 41, configured to secretly share first data with a partner based on a share of a first parameter to obtain a share of the first data; a first determining unit 43, configured to determine a share of a value of the first term based on the share of the first data; a second secret sharing unit 45, configured to secretly share second data with the partner based on a share of a second parameter and a random number to obtain a share of the second data; a second determining unit 47, configured to determine a coefficient of the second term based on the random number, where the coefficient of the second term and the first data are jointly used to determine a value of the second term; and a sending unit 49, configured to send the share of the value of the first term, the share of the second data, and the coefficient of the second term to the partner so that the partner determines the value of the loss function.

Figure 5:
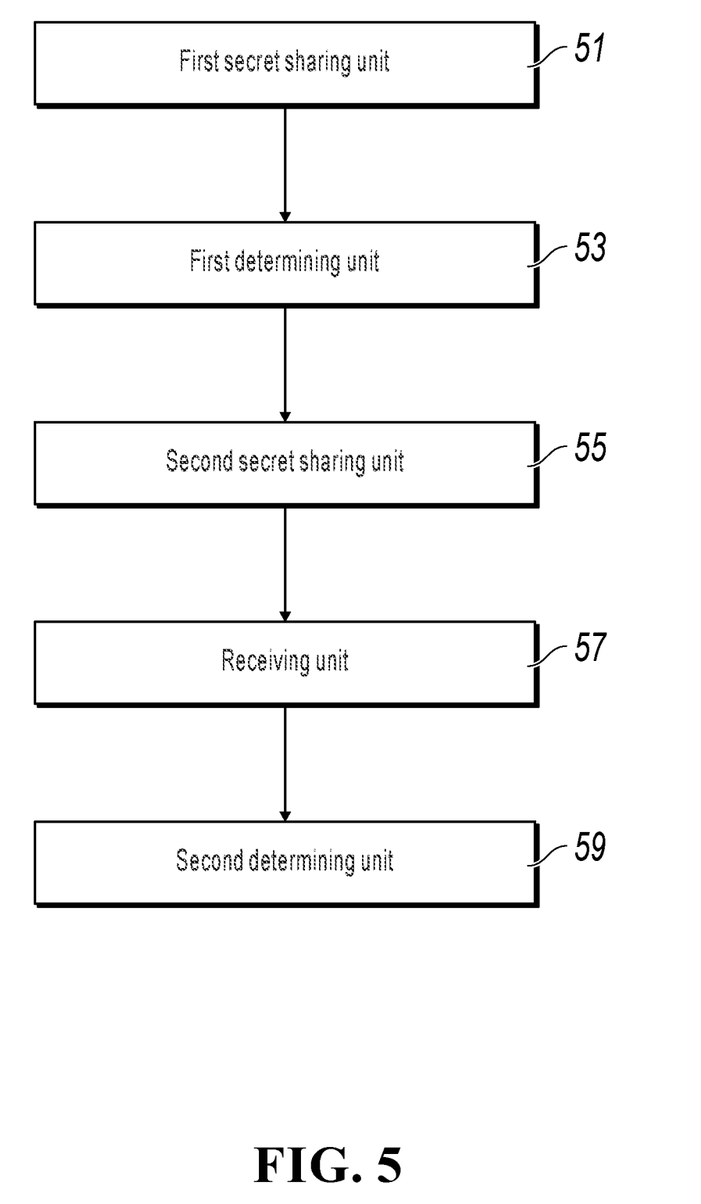
FIG. 5 is a functional structure diagram illustrating a loss function value determination device, according to an implementation of the present specification.

Based on the same inventive concept, the present specification further provides an implementation of another loss function value determination device. The loss function can include a first term and a second term. The first term and the second term are respectively different function terms in the loss function. The implementation can be applied to a second data party. The second data party can be a data party that owns a label value, for example, the second data party can only own the label value, or can further own some data items of the sample data. Referring to FIG. 5, the implementation can include the following units: a first secret sharing unit 51, configured to secretly share first data with a partner based on a share of a first parameter and a label value to obtain a first share of the first data; a first determining unit 53, configured to determine a first share of a value of the first term based on the share of the first data; a second secret sharing unit 55, configured to secretly share second data with the partner based on a share of a second parameter to obtain a first share of the second data; a receiving unit 57, configured to receive a second share of the value of the first term, a second share of the second data, and a coefficient of the second term from the partner, where the coefficient of the second term and the second data are jointly used to determine a value of the second term; and a second determining unit 59, configured to determine a value of the loss function based on the first share of the value of the first term, the second share of the value of the first term, the first share of the second data, the second share of the second data, and the coefficient of the second term.

Figure 6:
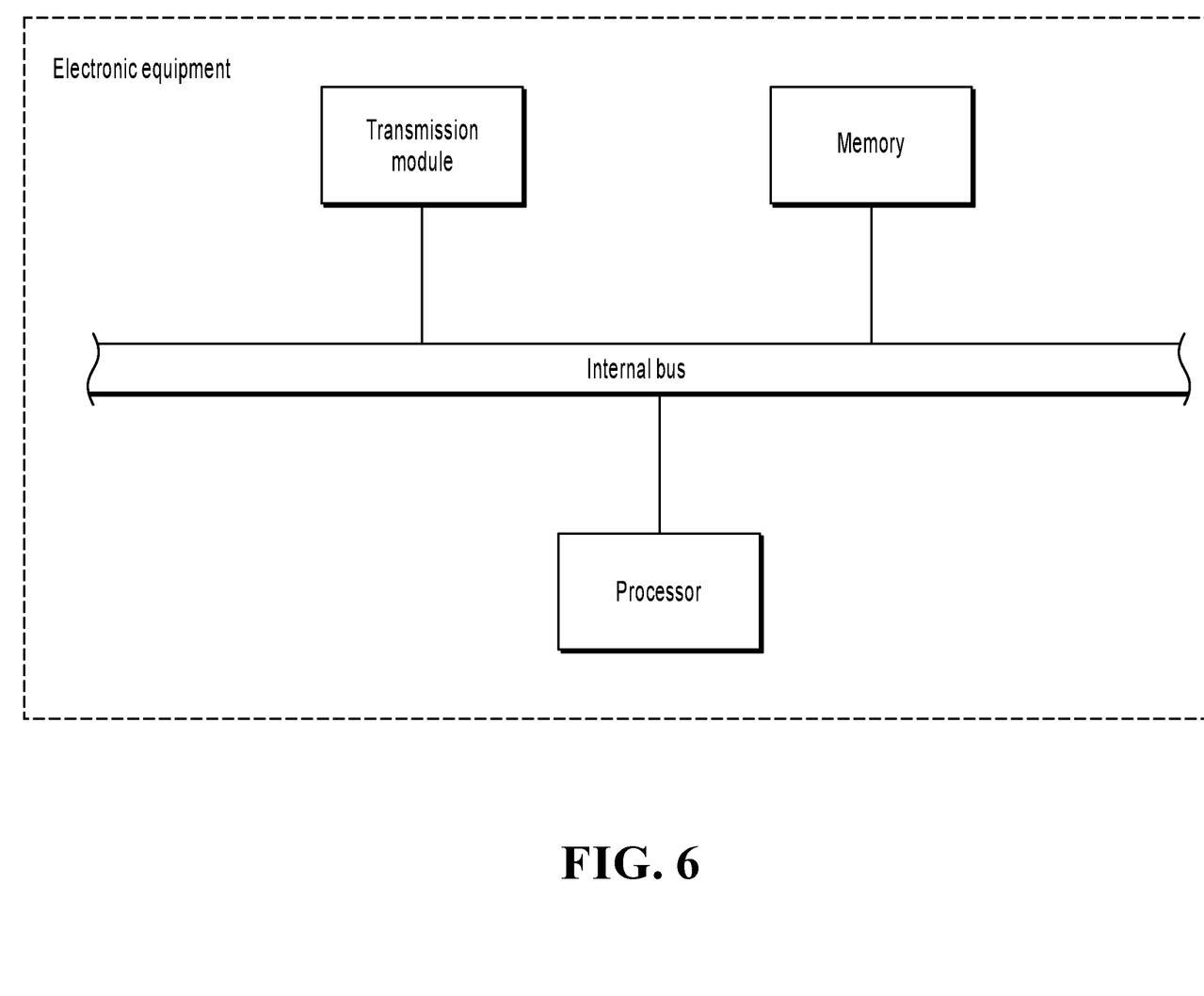
FIG. 6 is a functional structure diagram illustrating electronic equipment, according to an implementation of the present specification.

The following describes an implementation of electronic equipment in the present specification. FIG. 6 is a schematic diagram of a hardware structure of electronic equipment in the implementation. As shown in FIG. 6, the electronic equipment can include one or more processors (only one processor is shown in the figure), one or more memories, and one or more transmission modules. Certainly, a person of ordinary skill in the art understands that the hardware structure shown in FIG. 6 is merely an example, and does not limit the hardware structure of the previous electronic equipment. In practice, the electronic equipment can further include more or less components or units than those shown in FIG. 6, or can have a configuration different from that shown in FIG. 6.

The memory can include a high-speed random access memory, or can further include non-volatile memories, such as one or more magnetic storage devices, flash memories, or other non-volatile solid-state memories. Certainly, the memory can further include a remotely disposed network memory. The remotely disposed network memory can be connected to the electronic equipment by using a network such as the Internet, an intranet, a local area network, or a mobile communications network. The memory can be configured to store a program instruction or module of application software, for example, at least one of a program instruction or module of the implementation corresponding to FIG. 2, or a program instruction or module of the implementation corresponding to FIG. 3 in the present specification.

The processor can be implemented in any suitable methods. For example, the processor can take the form of, for example, a microprocessor or processor, a computer readable medium storing computer readable program code (such as software or firmware) executable by the microprocessor or processor, a logic gate, a switch, an application specific integrated circuit (ASIC), a programmable logic controller, and an embedded microcontroller. The processor can read and execute the program instruction or module in the memory.

The transmission module can be configured to perform data transmission via a network such as the Internet, an intranet, a local area network, or a mobile communications network.

It is worthwhile to note that the implementations in the present specification are progressively described, for the same or similar parts in some implementations, references can be made to each other, and each implementation focuses on a difference from other implementations. In particular, the apparatus implementation and the electronic equipment implementation are basically similar to the method implementation, and therefore are described briefly; for related parts, references can be made to the related descriptions in the method implementation. In addition, it can be understood that, after reading the present specification document, a person skilled in the art can figure out any combination of some or all of the implementations enumerated in the present specification without creative efforts, and these combinations also fall within the disclosure and protection scopes of the present specification.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCa1, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smart phone, a personal digital assistant, a media player, a navigation device, an e-mail device, a game console, a tablet computer, a wearable device, or a combination of any of these devices.

It can be seen from the descriptions of the implementations that a person skilled in the art can clearly understand that the present specification can be implemented by using software and a necessary general hardware platform. Based on such an understanding, the technical solutions in the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (can be a personal computer, a server, or a network device) to perform the methods described in some implementations or in some parts of the implementations of the present specification.

The present specification can be applied to many general-purpose or dedicated computer system environments or configurations, for example, a personal computer, a server computer, a handheld device or a portable device, a tablet device, a multi-processor system, a microprocessor-based system, a set-top box, a programmable consumer electronic device, a network PC, a minicomputer, a mainframe computer, and a distributed computing environment including any one of the previous systems or devices.

The present specification can be described in the general context of computer-executable instructions, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

Although the present specification is described by using the implementations, a person of ordinary skill in the art knows that many variations of the present specification can be made without departing from the spirit of the present specification. It is expected that the appended claims include these variations without departing from the spirit of the present specification.

What is claimed is:

1. A computer-implemented method for determining a value of a loss function based on secret sharing, the method comprising:

receiving, by one or more processors of a first data party and from a second data party, a first share of data generated based on a first parameter, wherein the first share of data is calculated by the first data party based on a secret sharing algorithm performed between the first data party and the second data party, the first parameter is an intermediate result obtained by the first data party based on performing the secret sharing algorithm;

determining, by the one or more processors, a first term based on the first share of the data;

generating, by the one or more processors, a second share of the data based on a second parameter and a plurality of random numbers, wherein the second data is calculated by the second data party based on the secret sharing algorithm, the second parameter is an immediate result obtained by the second data party based on performing the secret sharing algorithm;

transmitting, by the one or more processors to the second data party, the second share of the data;

determining, by the one or more processors, a coefficient of a second term based on accumulatively multiply the plurality of random numbers;

determining, by the one or more processors, the second term based on the coefficient of the second term and the second share of the data; and determining the value of the loss function based on the first term and the second term.

2. The computer-implemented method of claim 1, wherein the loss function comprises a logarithmic loss function or a square loss function.

3. The computer-implemented method of claim 1, wherein determining the first term comprises:
    accumulating the first share of the data to generate an accumulation result, the first term comprising the accumulation result.

4. The computer-implemented method of claim 3, wherein generating the second share comprises dividing the accumulation result by a number of elements of the data.

5. The computer-implemented method of claim 1, wherein determining the coefficient of the second term comprises:
    accumulatively multiplying random numbers to generate the coefficient of the second term.

6. The computer-implemented method of claim 1, further comprising:
    determining whether to terminate a training based on the value of the loss function.

7. The computer-implemented method of claim 1, wherein the first share of the data comprises label values that differentiate data types.

8. A non-transitory, computer-readable medium storing one or more instructions executable by a computer system to perform operations for determining a value of a loss function, the operations comprising:
    receiving, by one or more processors of a first data party and from a second data party, a first share of data generated based on a first parameter, wherein the first share of data is calculated by the first data party based on a secret sharing algorithm performed between the first data party and the second data party, the first parameter is an intermediate result obtained by the first data party based on performing the secret sharing algorithm;
    determining, by the one or more processors, a first term based on the first share of the data;
    generating, by the one or more processors, a second share of the data based on a second parameter and a plurality of random numbers, wherein the second share of the data is calculated by the second data party based on the secret sharing algorithm, the second parameter is an immediate result obtained by the second data party based on performing the secret sharing algorithm;
    transmitting, by the one or more processors to the second data party, the second share of the data;
    determining, by the one or more processors, a coefficient of a second term based on accumulatively multiply the plurality of random numbers;
    determining, by the one or more processors, the second term based on the coefficient of the second term and the second share of the data; and
    determining the value of the loss function based on the first term and the second term.

9. The non-transitory, computer-readable medium of claim 8, wherein the loss function comprises a logarithmic loss function or a square loss function.

10. The non-transitory, computer-readable medium of claim 8, wherein determining the first term comprises:
    accumulating the first share of the data to generate an accumulation result, the first term comprising the accumulation result.

11. The non-transitory, computer-readable medium of claim 10, wherein generating the second share comprises dividing the accumulation result by a number of elements of the data.

12. The non-transitory, computer-readable medium of claim 8, wherein determining the coefficient of the second term comprises:
    accumulatively multiplying random numbers to generate the coefficient of the second term.

13. The non-transitory, computer-readable medium of claim 8, wherein the operations further comprise:
    determining whether to terminate a training based on the value of the loss function.

14. The non-transitory, computer-readable medium of claim 8, wherein the first share of the data comprises label values that differentiate data types.

15. A computer-implemented system, comprising:
    one or more computers; and
    one or more computer memory devices interoperably coupled with the one or more computers and having tangible, non-transitory, machine-readable media storing one or more instructions that, when executed by the one or more computers, perform operations for determining a value of a loss function, the operations comprising:
    receiving, by one or more processors of a first data party and from a second data party, a first share of data generated based on a first parameter, wherein the first share of data is calculated by the first data party based on a secret sharing algorithm performed between the first data party and the second data party, the first parameter is an intermediate result obtained by the first data party based on performing the secret sharing algorithm;
    determining, by the one or more processors, a first term based on the first share of the data;
    generating, by the one or more processors, a second share of the data based on a second parameter and a plurality of random numbers, wherein the second share of the data is calculated by the second data party based on the secret sharing algorithm, the second parameter is an immediate result obtained by the second data party based on performing the secret sharing algorithm;

transmitting, by the one or more processors to the second data party, the second share of the data;

determining, by the one or more processors, a coefficient of a second term based on accumulatively multiply the plurality of random numbers;

determining, by the one or more processors, the second term based on the coefficient of the second term and the second share of the data; and determining the value of the loss function based on the first term and the second term.

16. The computer-implemented system of claim 15, wherein the loss function comprises a logarithmic loss function or a square loss function.

17. The computer-implemented system of claim 15, wherein determining the first term comprises:

accumulating the first share of the data to generate an accumulation result, the first term comprising the accumulation result.

18. The computer-implemented system of claim 15, wherein generating the second share comprises dividing the accumulation result by a number of elements of the data.

19. The computer-implemented system of claim 15, wherein determining the coefficient of the second term comprises:

accumulatively multiplying random numbers to generate the coefficient of the second term.

20. The computer-implemented system of claim 15, wherein the operations further comprise:

determining whether to terminate a training based on the value of the loss function.

* * * * *

UNITED STATES PATENT AND TRADEMARK OFFICE
CERTIFICATE OF CORRECTION

| | | |
|---|---|---|
| PATENT NO. | : 10,956,597 B2 | |
| APPLICATION NO. | : 16/786337 | |
| DATED | : March 23, 2021 | |
| INVENTOR(S) | : Zhou et al. | |

It is certified that error appears in the above-identified patent and that said Letters Patent is hereby corrected as shown below:

In the Claims

Column 17, Line 25, in Claim 1, delete 2nd "the" and insert -- a --, therefor.

Column 18, Line 3, in Claim 8, after "second" delete "share of the".

Column 18, Line 13, in Claim 8, delete 2nd "the" and insert -- a --.

Column 18, Line 65, in Claim 15, after "second" delete "share of the".

Column 19, Line 8, in Claim 15, delete 2nd "the" and insert -- a --, therefor.

Signed and Sealed this
Twenty-sixth Day of April, 2022

Katherine Kelly Vidal
*Director of the United States Patent and Trademark Office*